United States Patent

Huang

[11] Patent Number: 6,139,021
[45] Date of Patent: Oct. 31, 2000

[54] SEAL

[75] Inventor: Zhen Huang, Wuppertal, Germany

[73] Assignee: DaimlerChrysler AG, Stuttgart, Germany

[21] Appl. No.: 09/175,510

[22] Filed: Oct. 20, 1998

[30] Foreign Application Priority Data

Jan. 13, 1998 [DE] Germany ............... 198 00 827

[51] Int. Cl.$^7$ ................................ B60T 11/236
[52] U.S. Cl. ............................. 277/434; 277/910
[58] Field of Search ................ 277/434, 510, 277/910

[56] References Cited

U.S. PATENT DOCUMENTS

| | | | |
|---|---|---|---|
| 4,252,331 | 2/1981 | Siegel | 277/910 X |
| 4,991,857 | 2/1991 | Pippert | 277/910 X |
| 5,145,340 | 9/1992 | Allard | 277/510 X |
| 5,156,410 | 10/1992 | Hom et al. | 277/910 X |
| 5,743,535 | 4/1998 | Hodgins | 277/434 |

*Primary Examiner*—Anthony Knight
*Assistant Examiner*—Karlena D. Schwing
*Attorney, Agent, or Firm*—Max Fogiel

[57] ABSTRACT

A seal for hydraulically sealing a piston rod (1) that travels axially into and out of a holder, preferably a hydraulic shock absorber. A sealing component (11) of elastic plastic has one edge (12) resting against the piston rod, tensioned over an elastomeric component, and accommodated along with that component in a sealing chamber (10). The object is to simplify the seal, reduce friction, and ensure that it will work even at very low temperatures. The tension is accordingly generated by two rings (13 & 14) of packing cord positioned diagonally opposite each other in the cross-section of the chamber. The rings, as long as they are not tensioned against each other, against the inner surface of the chamber, and against the back (15) of the sealing component, occupy most of the space inside the chamber.

8 Claims, 2 Drawing Sheets

SEAL

BACKGROUND OF THE INVENTION

The present invention concerns a seal which is preferably employed to seal off a piston rod that travels in and out of a hydraulic shock absorber. The intent is to prevent the escape of the compressed hydraulic fluid, with low friction between the rod and the seal.

German OS 2 206 771 discloses a seal of this genus. One drawback is that the seal's seat must be manufactured as precise as possible and fit the seal exactly. Another is that tightness at low temperatures can be attained only at considerable tension, which results in unnecessary friction losses.

SUMMARY OF THE INVENTION

The object of the present invention is accordingly a seal of the aforesaid genus that will be simple in design, subject to little friction, and tight even at low temperatures.

The seal in accordance with the present invention has several advantages. The sealing chamber is straight-sided and accordingly simple. The sealing action can easily be controlled by packing it with rings of cords of materials with different properties and dimensions. A particular advantage, especially in cold weather, is the hydraulic augmentation of the radial pressure exerted by the sealing component on the piston rod, even when the cord loses elasticity at −40° C.

BRIEF DESCRIPTION OF THE DRAWINGS

One embodiment of the present invention will now be specified with reference to the accompanying drawing, wherein.

DESCRIPTION OF THE PREFERRED EMBODIMENTS

Figure 1:
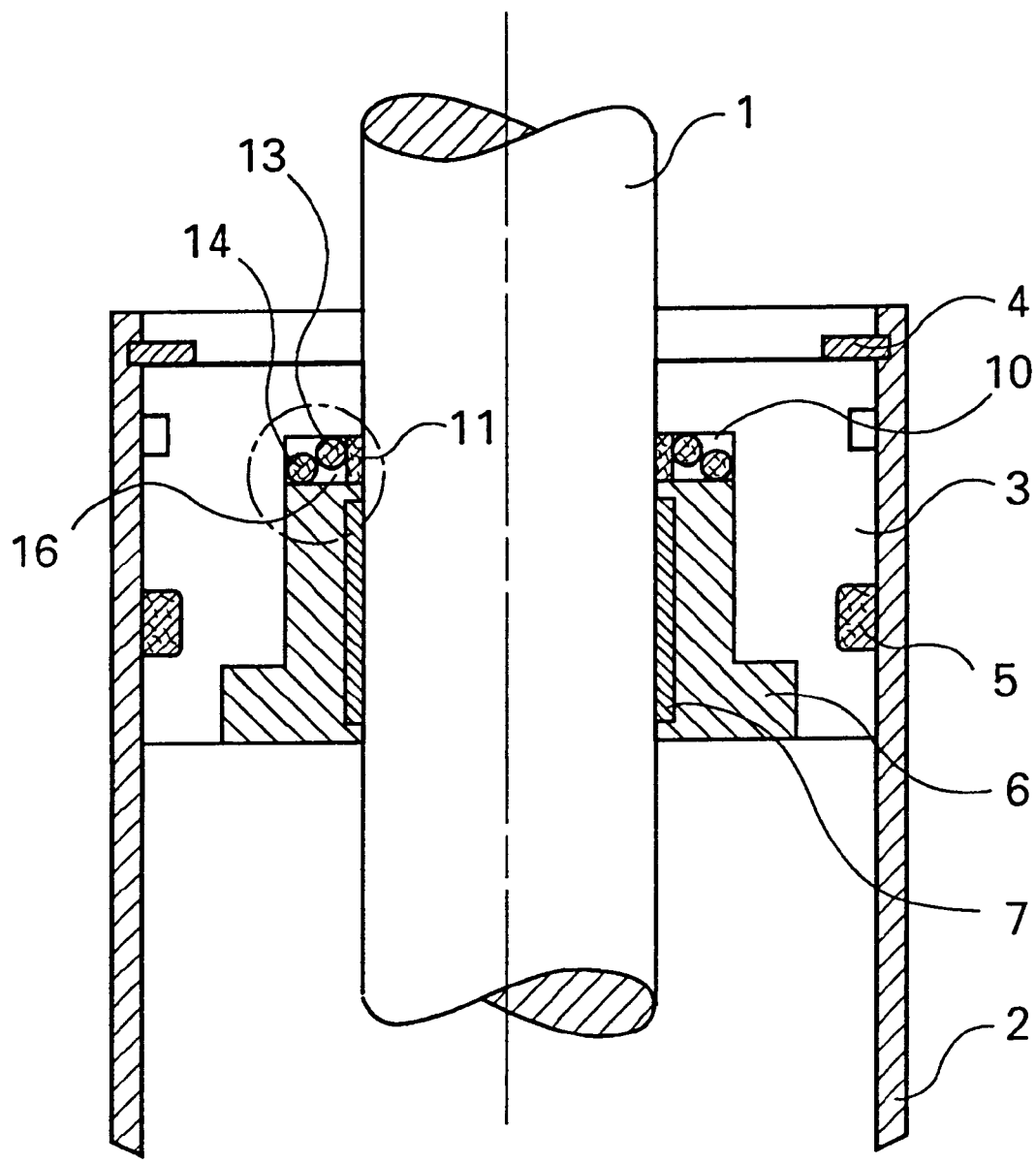
FIG. 1 is a section through where the piston rod emerges from the cylinder and FIG. 2 is a larger-scale illustration of the seal illustrated in FIG. 1.

The seal in the illustrated embodiment is employed to seal off a piston rod 1 that travels into and out of a hydraulic dashpot through the open base of its cylinder 2. FIG. 1 is a large-scale illustration of the vicinity.

An annular cap 3 is secured to the base by a tensioning ring 4. Between cap 3 and cylinder 2 is a seal 5. An annular seat 6 is accommodated in, and screwed by a threaded section to, a bore in the center of cap 3. Piston rod 1 is centered by smooth bush 7, also accommodated in the bore.

Figure 2:
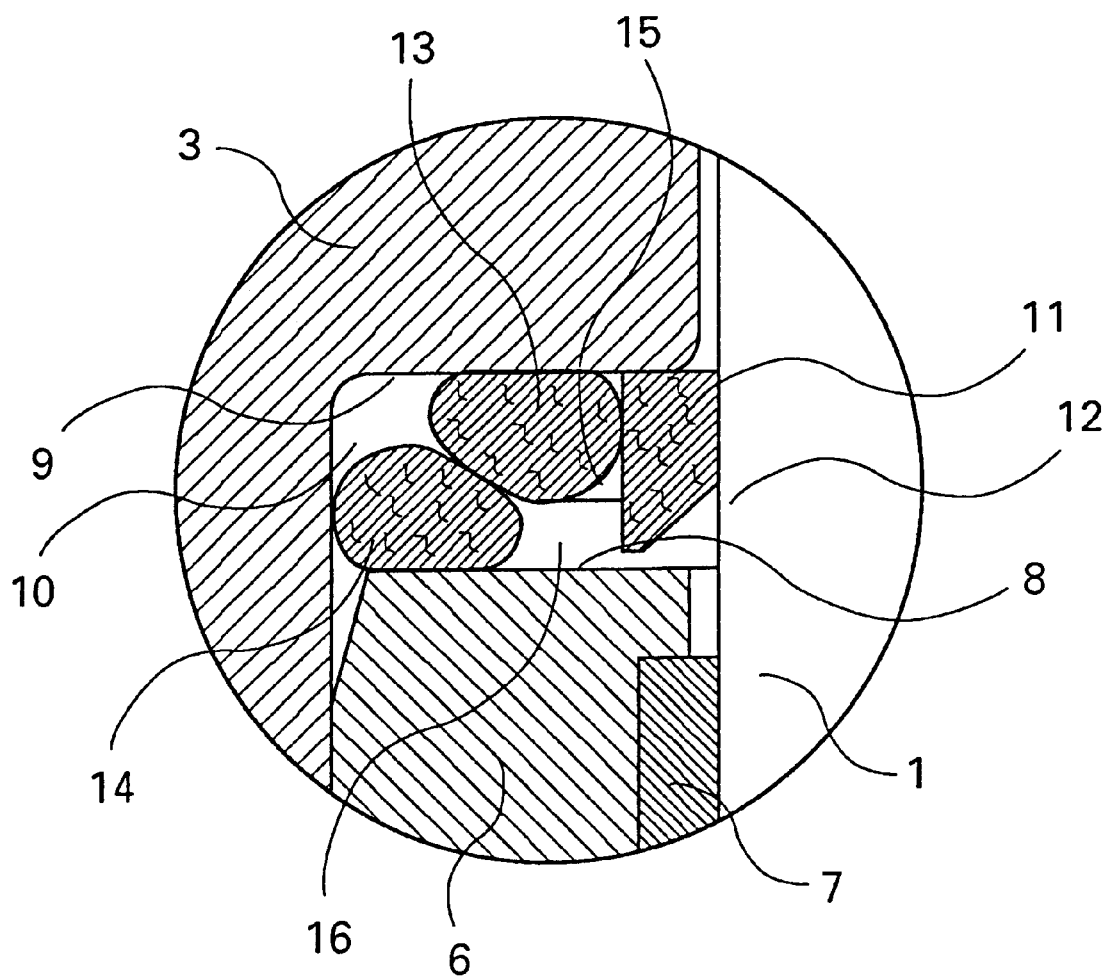

Space is left between the outer edge 8 of seat 6 and the base 9 of the bore, creating, in conjunction with the surrounding surfaces, a sealing chamber 10, which is illustrated larger-scale in FIG. 2 along with its contents. A sealing component 11 is accommodated around piston rod 1 at the center of sealing chamber 10. Since the inside of sealing component 11 tapers gently out in one direction and acutely in the other direction, only its edge 12 actually rests against the outer surface of piston rod 1. Sealing components of this nature have proven effective for sealing moving piston rods in hydraulic shock absorbers. Sealing component 11 is forced against piston rod 1 by two rings 13 and 14 of packing cord wrapped around the rod. The cross-section of combined rings 13 and 14 is smaller than that of sealing chamber 10. The untensioned cords in the illustrated example are round. They are accommodated in sealing chamber 10 with their cross-section diagonally opposite each other, the inner surface of the chamber, and the back 15 of sealing component 11.

Rings 13 and 14 of packing cord are thick enough to occupy more space when they rest against each other, against the facing surfaces of sealing chamber 10, and against the back 15 of sealing component 11, than the remaining cross-section of the chamber. Rings 13 and 14 and sealing component 11 are introduced into the bore in annular cap 3 before seat 6 is, and will extend loosely tilted against once another such that ring 13, which has the shorter diameter and rests against the back 15 of 11, will be the one nearer where the piston rod emerges, resting in the illustrated embodiment against the base 9 of the bore. As seat 6 is introduced into the bore and finally secured in its lower position, rings 13 and 14 will be forced together and against the remaining surfaces, deforming the cross-section to the state illustrated in FIG. 2. The tension and deformation cause ring 13 to exert radial force against sealing component 11.

The tension on rings 13 and 14 of packing cord and the resulting radial force exerted on sealing component 11 is hydraulically augmented. The hydraulic pressure in cylinder 2 is transmitted through the gap between bush 7 and piston rod 1 to the residual space 16 in sealing chamber 10. The pressure against the back of ring 14 creates a wedging action that increases the pressure between rings 13 and 14. This pressure is increased even farther by the increased pressure due to the pumping action exerted between piston rod 1 and bush 7, improving the sealing action even further. The aforesaid effect is particularly practical when the seal is employed in cold conditions, at −40° C. for example. At extremely low temperatures, the inherent elasticity of rings 13 and 14 decreases rapidly, and they will resume their original circular cross-section only slowly. Since, on the other hand, that cross-section will be that of a wedge when they are subject to tension, the aforesaid features will ensure satisfactory pressure of sealing component 11 against piston rod 1. Furthermore, this action will ensured even once the cords have lost elasticity as they age.

The seal can be produced in many versions with many different specifications by using materials of various mechanical properties-hardness, elasticity, and cold strength for example—for both rings of packing cord and by using one such material for ring 13 and another for ring 14.

| List of parts |
| --- |
| 1. piston rod |
| 2. cylinder |
| 3. cap |
| 4. tensioning ring |
| 5. seal |
| 6. seat |
| 7, bush |
| 8. outer edge |
| 9. base |
| 10. sealing chamber |
| 11. sealing component |
| 12. edge |
| 13. packing-cord ring |
| 14. packing-cord ring |
| 15. back |
| 16. residual space |

What is claimed is:

1. A seal for hydraulically sealing a piston rod traveling axially and oscillatingly into and out of a holder in form of a hydraulic shock absorber, comprising: a piston rod and a sealing component of elastic plastic with one sealing edge resting against said piston rod; a sealing chamber with a cross-section for accommodating said sealing component; two tensioned elastic rings of packing cord positioned diagonally opposite each other in said cross-section of said chamber and abutting each other for tensioning said sealing component radially, each of said two rings resting against a separate inner side of said chamber, one of said two rings abutting also against a back of said sealing component, and the other one of said two rings abutting also against a bottom of said chamber.

2. A seal as defined in claim 1, wherein at least one of said rings has a cross-section of a circle.

3. A seal as defined in claim 1, wherein said one of said two rings resting against the back of said sealing component is accommodated in said sealing chamber at a location where said piston rod emerges from said chamber.

4. A seal as defined in claim 1, wherein said two rings differ from each other in mechanical properties comprising hardness, elasticity, and cold strength.

5. A seal as defined in claim 1, wherein said one of said two rings is of material that is different from material of the other one of said two rings.

6. A seal as defined in claim 1, wherein said two rings are squeezed together to form non-circular cross-sections in each ring, said one of said two rings being squeezed against said back of said sealing component and against a top side of said chamber, said other one of said two rings being squeezed against said bottom of said chamber and a side of said chamber.

7. A seal for hydraulically sealing a piston rod traveling axially and oscillatingly into and out of a holder in form of a hydraulic shock absorber, comprising: a piston rod and a sealing component of elastic plastic with one sealing edge resting against said piston rod; a sealing chamber with a cross-section for accommodating said sealing component; two tensioned elastic rings of packing cord positioned diagonally opposite each other in said cross-section of said chamber and abutting each other for tensioning said sealing component radially, each of said two rings resting against a different inner side of said chamber, one of said two rings abutting also only against a back of said sealing component, and the other one of said two rings abutting also only against a bottom of said chamber, said two rings being squeezed together to form noncircular cross-sections in each ring, said one of said two rings being squeezed against said back of said sealing component and against a top side of said chamber, said other one of said two rings being squeezed against said bottom of said chamber and a side of said chamber.

8. A seal for hydraulically sealing a piston rod traveling axially and oscillatingly into and out of a holder in form of a hydraulic shock absorber, comprising: a piston rod and a sealing component of elastic plastic with one sealing edge resting against said piston rod; a sealing chamber with a cross-section for accommodating said sealing component; two tensioned elastic rings of packing cord positioned diagonally opposite each other in said cross-section of said chamber and abutting each other for tensioning said sealing component radially, each of said two rings resting against a different inner side of said chamber, one of said two rings abutting also only against a back of said sealing component, and the other one of said two rings abutting also only against a bottom of said chamber, said two rings being squeezed together to form noncircular cross-sections in each ring, said one of said two rings being squeezed against said back of said sealing component and against a top side of said chamber, said other one of said two rings being squeezed against said bottom of said chamber and a side of said chamber, said one of said two rings resting against the back of said sealing component being accommodated in said sealing chamber at a location where said piston rod emerges from said chamber, said two rings differing from each other in mechanical properties, said one of said two rings being of material that is different from material of the other one of said two rings.

* * * * *

UNITED STATES PATENT AND TRADEMARK OFFICE
CERTIFICATE OF CORRECTION

PATENT NO. : 6,139,021
DATED : October 31, 2000
INVENTOR(S) : Zhen Huang and Claus-Dieter Herrmann It is certified that error appears in the above-identified patent and that said Letters Patent is hereby corrected as shown below:

First page, left column:

Change Item [73] to read: DaimlerChrysler AG, Stuttgart, Germany and Krupp Bilstien GmbH, Ennepetal, Germany Change Item [75] to read: Zhen Huang, Wuppertal, Germany
Claus-Dieter Herrmann, Gäufelden, Germany Signed and Sealed this Nineteenth Day of June, 2001

Attest:

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO.   : 6,139,021
DATED        : October 31, 2000
INVENTOR(S)  : Zhen Huang and Claus-Dieter Herrmann Page 1 of 1

It is certified that error appears in the above-identified patent and that said Letters Patent is hereby corrected as shown below:

<u>Title page,</u>
Change Item [73] to read -- DaimlerChrysler AG. Stuttgart, Germany and
                            Krupp Bilstein GmbH, Ennepetal, Germany Change Item [75] to read -- Zhen Huang, Wuppertal, Germany
                            Claus-Dieter Herrmann, Gäufelden, Germany This certificate supercedes certificate of correction issued May 8, 2001.

Signed and Sealed this

Twenty-seventh Day of November, 2001

*Attest:*

*Nicholas P. Godici*

*Attesting Officer*

NICHOLAS P. GODICI
*Acting Director of the United States Patent and Trademark Office*